United States Patent [19]

Bouygues et al.

[11] 3,903,435

[45] Sept. 2, 1975

[54] CORRECTING SYSTEMS USING PIEZOELECTRIC WEDGES

[75] Inventors: Jean Bouygues; René Gerard, both of Paris, France

[73] Assignee: Thomson-CSF, Paris, France

[22] Filed: Mar. 21, 1974

[21] Appl. No.: 453,637

[30] Foreign Application Priority Data

Mar. 27, 1973 France .............................. 73.10943

[52] U.S. Cl. .................... 310/8.1; 310/8.3; 310/8.7; 310/9.1

[51] Int. Cl.[2] ............................................ H01V 7/00

[58] Field of Search ........... 310/8, 8.1, 8.2, 8.3, 8.6, 310/8.7, 9.1, 9.4

[56] References Cited

UNITED STATES PATENTS

| | | | |
|---|---|---|---|
| 3,141,100 | 7/1964 | Hart | 310/8.6 |
| 3,215,133 | 11/1965 | Farrell | 310/8.3 X |
| 3,524,196 | 8/1970 | Church et al. | 310/8 |
| 3,614,486 | 10/1971 | Smiley | 310/8.3 |

*Primary Examiner*—Mark O. Budd

*Attorney, Agent, or Firm*—Cushman, Darby & Cushman

[57] ABSTRACT

A system of piezoelectric wedges having high accurate and stable characteristics, which system can readily be introduced into a mechanical assembly, is provided. To this end, a stack of piezoelectric ceramic discs is surrounded by a steel component of suitable elasticity, exhibiting two terminal blocks and two thin drilled out lateral cheeks. The stack is prestressed by the action of a screw which moves two spacers towards each other, repelling a chamfered end piece at the same time. The application of a positive or negative direct voltage to the piezoelectric discs results in an extension or shortening of proportional magnitude, along the axis of the component.

8 Claims, 5 Drawing Figures

CORRECTING SYSTEMS USING PIEZOELECTRIC WEDGES

Piezo-electric wedge systems make it possible to correct positioning errors with an accuracy of better than one micron, provided that their mechanical assembly satisfies conditions of extreme accuracy.

The object of the invention is to facilitate the attainment of these conditions by providing a preset mechanical component which takes the form of an elastic element one dimension of which is a very accurate and time-stable function of the voltage controlling the piezo-electric wedges which produce its deformation.

If a stack of piezo-electric discs is arranged between a fixed component and a moving component, in a positioning device, then the following phenomena are observed:

1. If there is no prestress in the stack, then assembly clearances will exist of an order of magnitude such that the accuracy of the piezoelectric wedge is rendered useless, and the system is not reliable;

2. If there is prestress in the system, then because of the mismatching of the surfaces of the different components, small oblique displacements are still observed, which reduce the effective travel, and this is also a drawback.

The invention overcomes these drawbacks:

According to the present invention there is provided a correcting system comprising a component having at least two parallel terminal faces, consisting of two rigid blocks, situated at the extremities of said component presenting said faces, and of two plane elastically deformable cheeks attaching laterally said blocks, a stack of piezoelectric wedges the expansion of which tends to force said blocks apart, means for adjusting the stresses produced by said wedges in said component being inserted between said stack and said blocks, and means being provided for applying a variable direct voltage to said wedges.

The invention will be better understood and other of its features rendered apparent, from a consideration of the description which now follows, and of the accompanying drawings in which.

Figures 1, 2:
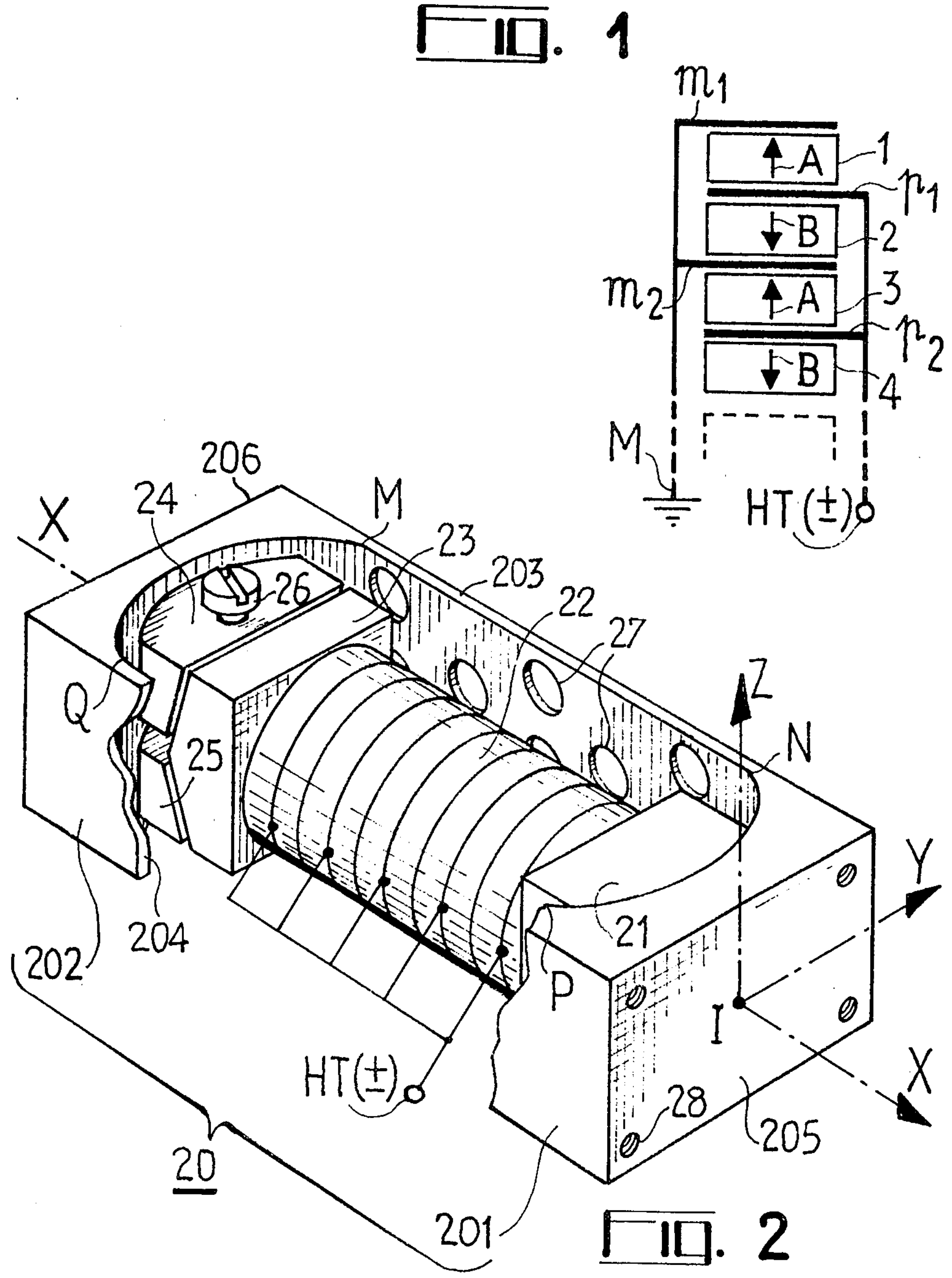
FIG. 1 is a block diagram of a stack of piezoelectric discs in accordance with the prior art.
FIG. 2 is a perspective view of a system in accordance with the invention.

FIG. 1 shows a stack of piezoelectric ceramic discs the bias on which has been produced by the prior application of an electric field having the direction indicated by the arrow A or the arrow B, in all cases perpendicular to the flat faces of the discs, A and B being directed in reverse directions. The discs with the odd numbered references, 1, 3 biased in the direction of the arrow A, are interspersed with the discs referenced 2, 4 etcetera, which are biased in the direction of the arrow B. Each disc is silverplated on its two faces and two contiguous faces of the stack are placed in contact with one and the same electrode. Such is the case for example with the electrode $p_1$, between the discs 1 and 2, and the electrode $m_2$ between the discs 2 and 3. Faces which are similarly disposed in relation to the arrows, are connected by their electrodes either to the common earth M (electrodes $m_1$, $m_2$, etcetera) or to a pole HT (electrodes $p_1$, $p_2$, etcetera) which is itself connected to a positive or negative direct voltage source.

The operation of the stack as a piezoelectric wedge is as follows:

When a direct voltage is applied between the pole HT (±) and earth M, the discs in the stack either expand or contract. The order of magnitude of the variation in thickness is, for example around 1 micron for some few tens of volts. It will be understood that the assembly of the discs must be located with the greatest possible care in order for the device to be effective and above all reliable.

In FIG. 2, a system in accordance with the invention consists of a parallelepiped component 20 of steel or some material having low elasticity albeit enough, bearing in mind the parameters involved, to undergo perceptible dimensional variations under the effect of the stresses exerted mind the parameters involved, to undergo perceptible dimensional variations under the effect of the stresses exerted by the stack of piezoelectric discs. This component is provided with a wide recess to accomodate the stack and to reduce the effective cross-sectional area of the elastic component. On one large face, there can be seen the recess profile MNPQ, involving two straight line sections MN and PQ and two arcuate sections NP and MQ, the central part of which defines an arc whose circumference is as regular as possible. The recess, within the component 20, delimits:

— two terminal blocks 201 and 202 with cylindrical internal faces;

— two flat, rigid cheeks 203 and 204 which are drilled out as required at the time of adjusting the system and which form the deformable part of the component 20.

For the purposes of the ensuing description, we will consider a reference three-axis system, IX, IY, IZ, defining three planes parallel to three contiguous faces of the parallelepiped. If we use the references 205 and 206 to designate the two opposite small faces of the component 20, then the origin I of the three-axis system can be located at the centre of the face 205, the axis IX being coincidental with an axis of symmetry XX of the parallelepiped. The plane XIY is parallel to the plane of the curve MNPQ, the axis IZ being perpendicular to said latter plane (FIG. 2).

Inside the recess in the component 20, on the axis XX, working for example from the face 205 towards the face 206, there is placed an end piece 21, a stack 22 similar to that shown in FIG. 1, an end piece 23 and a set of spacers 24 and 25. The end piece 21 and the spacers 24 and 25 have cylindrical faces adapted to the shape of the recess MNPQ. The opposite face of the end piece 21 is flat as also is that face of the end piece 23 which is in contact with the stack 22. The end piece 23 has two inclined flat portions symmetrical in relation to the plane XIY, in contact with coplanar, complementary portions cut in the spacers 24 and 25 so that the end piece 23 tends to move the latter apart when the assembly is compressed. A screw 26 passing through said spacers parallel to the axis IZ, tends, on the other hand to move them together and is used to place the device in a state of prestress by the traction in the component 20 and the compression of the stack 22. When the device is properly adjusted, the stack 22 remains compressed even under the heaviest contraction it is intended that the piezoelectric discs should produce.

To facilitate adjustment, holes 27 are drilled in the cheeks 202 and 204, reducing the effective cross-sectional area over which the increased stress produced by the traction is exerted, and increasing the elastic deformation of the cheeks for the same applied effort.

By way of example, with a component 20 100 mm long (dimension in the XX direction) a variation in length of 10 microns to either side of the prestressed state, was achieved. The maximum voltage applied was 800 volts. In this range of variation, the phenomenon was virtually linear and a proportionality coefficient in the order of 80 volts per micron was noted between the voltage and the length variation. Thus a piezoelectric wedge has been produced which constitutes a system having a remarkable mechanical advantage. It is clear that in order to be effective, the device shown in FIG. 2 must be capable of being solidly attached to the pieces performing the reciprocal motion.

To this end, threaded holes 28 can be provided in the terminal faces 205 and 206 in order to receive fixing screws.

Figure 3:
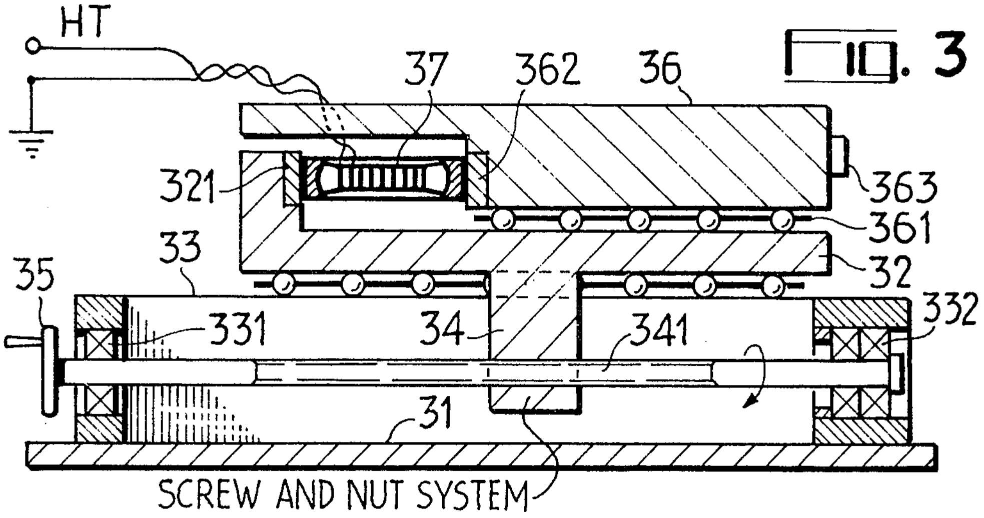
FIGS. 3, 4 and 5 are schematic views of three examples of devices using systems in accordance with the invention.

FIG. 3 shows a first example of a device using a system in accordance with the invention. A plate 32 displaces parallel to a base 31, thanks to the provision of a roller track 33 attached to said base 31. The movement is produced by a screw and nut system 34, in which the screw is represented by the threaded section of a shaft 341. Said shaft, driven by a crank 35, rotates in a bearing 331 and a double-acting stop 332, that is to say one without any lateral play. The plate 32, in turn carries a plate 36 through a roller system 361. A system 37 similar to that shown in FIG. 2 is arranged between a lip 321 on the plate 32 and a lip 362 on the plate 36. The control of the position is produced for example by means of an interferometer device comprising, in addition to elements which have not been shown, a mirror 363 attached to the edge of the plate 36 independently of the plate 32 whose position is controlled with less accuracy by means of the screw and nut system 34.

An additional advantage of the invention, in the case shown in FIG. 3, arises out of the fact that the insertion of the system 37 between the plates 32 and 36 does not require the installation of any associated prestressing element, in the way which would have been necessary using a piezoelectric wedge constituted simply by a stack.

Figure 4:
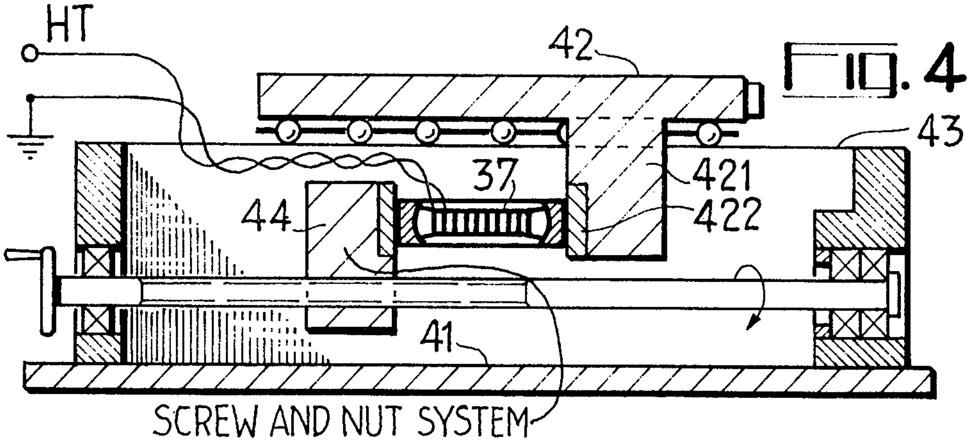

FIG. 4 illustrates a second example of a device using a system in accordance with the invention. A plate 42 displaces parallel to a base 41, on a roller track 43 fixed to said base 41. A system 37 is inserted between the screw and nut system 44 and the edge 422 of a downward extension 421 belonging to the plate 42. If this application is compared to the preceding one, it will be seen that the invention is exploited to get rid of one of the plates shown in FIG. 3.

Figure 5:
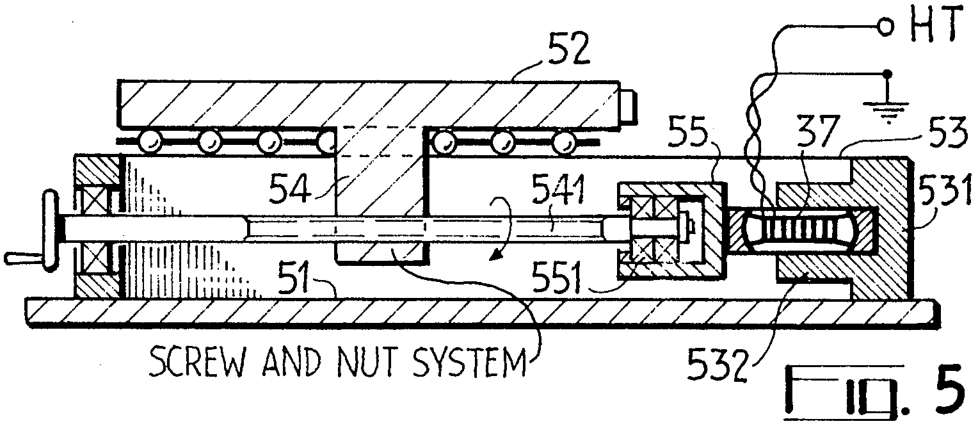

FIG. 5 illustrates a variant embodiment of the second example. A plate 52 rolls on a box 53 attached to a base 51. Here, the plate 52 is fixed, without any intermediate component, to the screw and nut system 54 traversed by the screwed shaft 541. The complementary displacement by piezoelectric wedge, is produced, in this case by acting on the double-acting stop (here marked 551). This is keyed into a housing 55. The wall 531 of the box 52 is stiffened by a housing component 532 into which the system 37 referred to in the preceding figures is inserted. Said system is secured to the box 53 by welding or by some other fixing method.

Also in accordance with the invention are systems comprising wedges of a non-circular shape or discs consisting of any piezoelectric material other than ceramics.

The invention is applicable to apparatus in which highly accurate positioning (to within a micron or a fraction of a micron) must be produced quickly. This is the case in particular in electronic masking machines and mask photorepeater devices of the kind employed in the manufacture of integrated circuits.

What we claim is:

1. A correcting system comprising a component having at least two parallel terminal faces, consisting of two rigid blocks, situated at the extremities of said component presenting said faces, and of two plane elastically deformable cheeks attaching laterally said blocks, a stack of piezoelectric wedges being preloaded, means for adjusting said preloading consisting of a screw and nut system comprising two spacers drilled in order to function as nuts, and chamfered together with an end piece having two oblique faces said oblique faces and said chamfered spacers being designed so that the end piece tends to force the spacers apart when said spacers are moved together by means of the screw and nut system, and means being provided for applying a variable direct voltage to said wedges.

2. A system as claimed in claim 1, wherein said wedges are constituted by piezoelectric ceramic discs having an axis perpendicular to said faces.

3. A system as claimed in claim 1, wherein said cheeks are drilled out for adjusting the expansion of said component under the effect of the stresses produced by said wedges.

4. A system as claimed in claim 1, wherein said component is a rectangular parallelepiped, made of steel, recessed in order to house said stack and said adjusting means.

5. A system as claimed in claim 1, wherein said blocks and said spacers have contacting surfaces respectively of concave and convex form, in order to facilitate the alignment of the axes of symmetry of said stack and said component.

6. A device for positioning an object holder, of the kind comprising a plate translated by first means, wherein, between said object holder and said plate, second translating means are constituted by a correcting system as claimed by claim 1.

7. A device for positioning an object holder plate, of the kind comprising a screw and nut system, wherein the position of the screw of said system is adjustable by means of a correcting system as claimed in claim 1.

8. A device for positioning an object holder plate, of the kind comprising a screw and nut system, wherein between said plate and the screw and nut system a correcting system as claimed in claim 1 is arranged.

* * * * *